Oct. 12, 1971  B. ZIPPEL ET AL  3,611,480
MOULD FILLING PLANTS
Filed Feb. 20, 1970
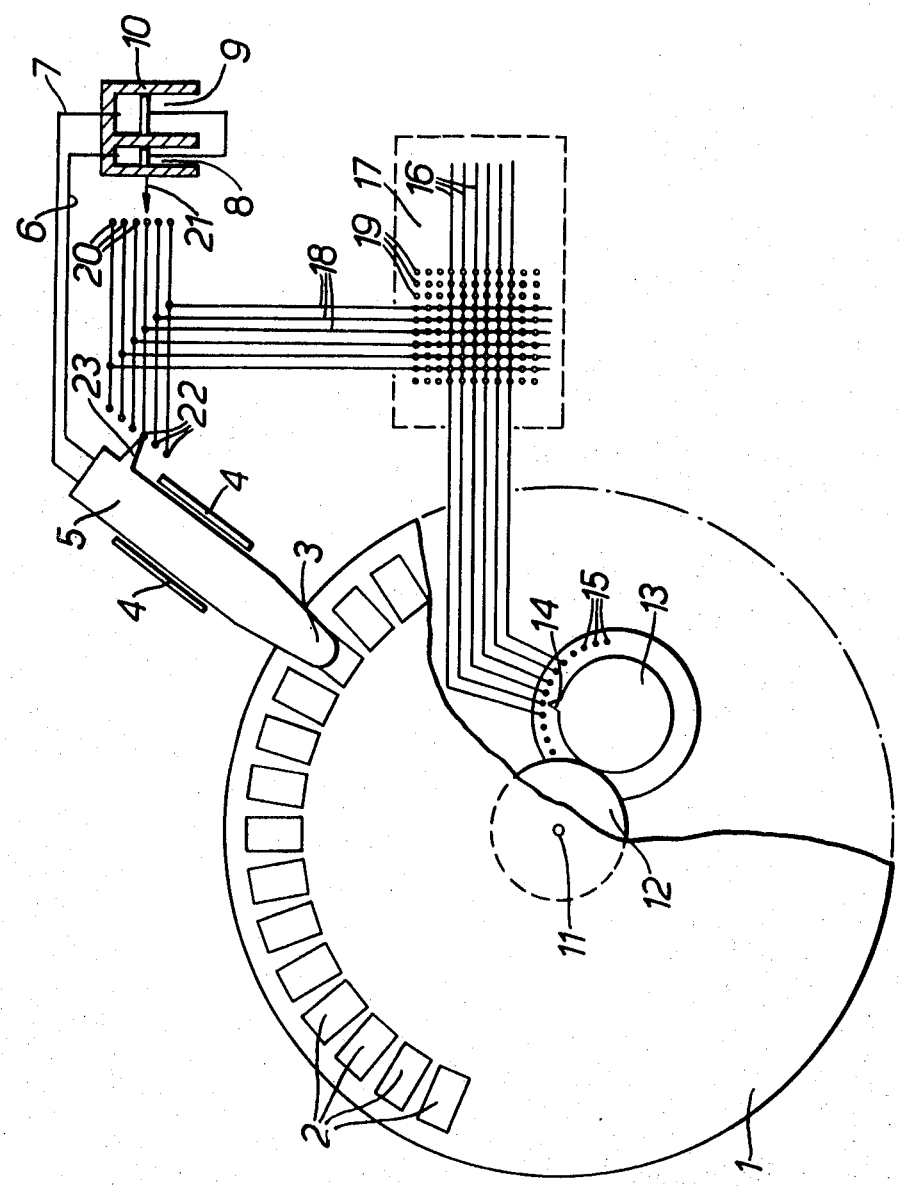
INVENTORS
BERND ZIPPEL
ALFRED SCHLIECKMANN
BY
*Nolte & Nolte*
ATTORNEYS

3,611,480
MOULD FILLING PLANTS

Bernd Zippel, Langenhain, and Alfred Schlieckmann, Eschwege, Germany, assignors to Richard Zippel & Co. KG, Eschwege, Germany
Filed Feb. 20, 1970, Ser. No. 12,953
Claims priority, application Germany, Mar. 29, 1969, P 19 16 329.2
Int. Cl. B29c 3/06, 5/00; B29h 3/08
U.S. Cl. 18—4 P
6 Claims

ABSTRACT OF THE DISCLOSURE

A control arrangement for a plastics material moulding plant is disclosed. The arrangement comprises an endless conveyor for carrying a plurality of moulds distributed on the conveyor and mould filling means for successively discharging mould filling material into the moulds. The conveyor is motivated so as to position the moulds successively at the mould filling means and the conveyor is coupled to a rotary selector of a selector switch. The fixed contacts of the selector switch are connected to a plurality of first conductors of a crossed-bar switch. The crossed-bar switch is provided with a plurality of further conductors which are selectably interconnectable to the first conductors. The further conductors are connected to control means for controlling the quantity of mould filling material discharged into the respective moulds in dependence on the interconnections between the first and further conductors.

BACKGROUND OF THE INVENTION

The present invention relates to improvements in mould filling plants, especially to such plants for processing multi-component plastics material.

In the processing of multi-component plastics and foaming plastics materials, the pressures occurring inside the mould are not so high as those involved in the processing of thermoplastics material. Thus, the moulds used in this case are of lighter construction and also have closing means which are not designed for such high closing forces. It is possible to insert the moulds individually in the filling machine, fill them, then immediately remove them from the filling machine and close them. Thus, it has been proposed to utilize mould lines in the form of circulating conveyor belts or revolving roundabouts on which the moulds are mounted and carried, in the open state, into the mould filling installation where they are filled, and, after passing out of the latter, are immediately closed. These closed moulds are then carried onwards by the conveyor means, possibly through heating zones in order to accelerate the hardening of the plastics material in the mould.

Now plants of this type for processing multi-component plastics have moulds of the most diverse shapes and filling volumes, since, for reasons connected with economical production, not only one article but different articles are produced in a plant with many moulds. If, for example, a plant of this type is used for the manufacture of shoe soles, each mould is adapted for the production of a different size and type of sole. Before the filling of each mould, the mould filling installation must be adjusted to a different discharge volume, corresponding with the various filling volumes for the individual moulds.

At first, this was effected purely by manual operation: according to figures provided on the moulds, an operator adjusted corresponding values on the mould filling installation. However, this resulted in the operator rapidly becoming tired, and consequently, in a high reject output of the plant for processing multi-component plastics. In a conveyor system consisting of a roundabout, adjustable stops were fitted below the rotary table of the roundabout and carried out the control function. Although this led to automatic adjustment of the plant, it gave rise to difficulties through the fact that the stops in some plants became contaminated, namely through foaming-over of the plastics material, and so caused defective filling. Difficulties also occurred in the event of re-adjustment during the course of operation, which always becomes necessary if temperature in the production hall changes. Minor corrections could not be carried out at all during operation, and for larger corrections it was necessary to step the installation.

Other proposals concerning conveyor lines, which made provision for stops on the mould supports, were likewise unsuccessful because of the inaccuracy of the discharge quantities set, with the result that recourse was again had to manual operation.

SUMMARY OF THE INVENTION

According to the present invention there is provided a control arrangement for a plastics material moulding plant comprising an endless conveyor for carrying a plurality of moulds distributed on the conveyor, mould filling means for successively discharging mould filling material into the moulds, motivating means for imparting a plurality of step displacements to the conveyor to position the moulds successively at the mould filling means, a selector switch comprising a plurality of first contact means and a first selector, displacement means for displacing the first selector relative to the first contact means in synchronism with the step displacements of the conveyor to selectively operate one of said first contact means, a crossed-bar switch having a plurality of first conductors respectively connected to the first contact means and a plurality of further conductors selectably interconnectable to the first conductors, the further conductors being connected to control means for controlling the quantity of the mould filling material discharged into the respective moulds in dependence on the interconnections between the first and further conductors.

The crossed-bar switch, which comprises parallel bar conductors arranged in two planes and having, at their points of intersection, perforations passing through the insulating material lying between the two planes of the bar conductors and serving for the insertion of contact pins which, on being inserted, in each case connect one bar conductor disposed in one direction with another bar conductor disposed in the other direction, ensures a satisfactory facility for adjusting even slight variations in discharge volume during the operation of the plant. Thus, it is only necessary for the interconnecting plug to be moved into interconnect a different pair of crossed-bar conductors to obtain a slightly altered discharge quantity.

In arranging the system it is expedient to proceed in such a way that the crossed bars, which form a plurality of further conductors, are connected to limit switches which are located in the path of travel of metering cylinders of the mould filling installation. In this way an electrical circuit is formed so that only a predetermined one of the contact means 20 of the limit switch arrangement becomes effective for control purposes. It is particularly advantageous to arrange the limit switch arrangement in such a way that it becomes effective during the intake stroke of the metering cylinders. In this way, each of the discharges into the respective moulds is regulated, since the termination of each discharge is determined by the extent of the movement of the metering cylinders.

It is expedient if the discharge head or nozzle of the mould filling installation is displaceable during the discharge process and its end position is determined by a further limit switch arrangement, the fixed contact means of which are connected to the further conductors of the crossed-bar switch. Displaceability of the discharge head ensures that the moulds are filled in much more uniform manner. The products are considerably improved as a result. The displacement of the discharge nozzle is thus adjusted according to the length of each mould. In general, there is a connection between the mould length and the filling volume, particularly when an article is manufactured in different sizes on the plant, as is the case, for example, in the production of shoe soles. Thus, adjustment by means of a further limit switch arrangement, the contact means of which are connected to the further conductors of the crossed-bar switch, provides a control facility which is very simple and trouble-free in operation.

It is expedient for one of the further conductors to be connected to a control switch for controlling the supply of a solvent, of the mould filling material, to the discharge head of the mould filling installation and for the passage of the discharge head into the cleaning position. Thus, the discharge head can be cleaned again and again in any predetermined position of the conveyor.

If, for example, shoe soles are produced on the plant, it will be expedient to provide each mould on the endless conveyor system for a different size or type of shoe sole. However, the same numbers are not required of all the sizes and types of shoe soles. For there are specific average values which are predominantly required. If sufficient shoe soles of the less sought-after sizes have been produced on a plant which is provided with many different moulds, it is possible, by simply removing the respective interconnecting contact pin from the crossed-bar switch, to adjust the plant in such a way that the mould in question is no longer filled. If, therefore, a whole row of moulds which are no longer to be filled, are arranged one behind the other in the mould line, the mould filling installation must be cleaned whilst these unused moulds are carried past the filling station, so that the residual quantities of mixed multi-component plastics do not cover the discharge head while the moulds, which are no longer being filled, pass by. In this event, the particular interconnecting contact pin, or pins, which has been withdrawn is inserted in that bar, or further conductor, which has been provided for the cleaning of the discharge head. The mould filling plant, which continues to operate completely automatically at the same rate, now functions while omitting to fill certain moulds.

Owing to fixed hardening times, the conveyor line may not, generally, travel faster than is permitted by the regulation concerning the maximum speed in the case of a specific sort of plastics material.

BRIEF DESCRIPTION OF THE DRAWING

An embodiment of the present invention will now be more particularly described with reference to the single figure of the accompanying drawing, which shows a plan view of a mould processing plant embodying the invention, part of the mould conveyor turntable being cut away in order to render a rotatable contact plate visible.

DESCRIPTION OF THE PREFERRED EMBODIMENT

Referring now to the drawing, a plurality of moulds 2 are arranged next to one another near the periphery of the rotatable table 1 of the mould conveyor. These moulds are filled by the discharge head 3 of the mould filling installation. The discharge head 3 is in the form of a nozzle which is attached to a displaceable mounting member 5. The mounting member 5 is disposed in guides 4 for displacement by a drive means, which is not illustrated in the drawing. Through this mounting 5 pass the supply conduits 6 and 7 for the two components of the plastics material, which conduits originate from the metering pistons 8 and 9, which are accommodated in respective cylindrical portions of a holder 10. A rotatable shaft 11, to which the table 1 is mounted, also drives a gear wheel 12, which meshes with another gear wheel 13. The gear wheel 13 carries a selector tongue 14 which engages successively with contact means 15, as the gear wheel 13 rotates. The individual contact means 15 are connected to contact bars 16, which form a plurality of first conductors of the crossed-bar switch 17. In the interests of simplicity of illustration, only some of the crossed-bar conductors of the switch 17 are shown in the drawing. In another plane of the crossed-bar switch 17 are located bars 18 which are arranged perpendicularly to the bars 16, but do not touch the latter. The bars 16 form a plurality of further conductors of the crossed-bar switch 17. The crossed-bar switch 17 has a plurality of perforations 19 in which metal contact pins (not shown in the drawing) may be inserted, which then produce, at the place of insertion, a conductive connection between the corresponding bars 16 and 18. The bars 18 are conductively connected to contacts 20, which represent contact means of the limit switch which are actuated by movable selector 21 of the metering cylinders 8 and 9 during the metering process. Each of the contact means 20 may comprise a pair of contacts which are connected together when engaged by the movable selector 21. Alternatively, the selector 21 may itself be a movable contact, in which case each contact means 20 may be only a single contact. The bars 18 are likewise conductively connected to contact means 22, of a further limit switch. The further limit switch is provided with a movable selector 23 carried by the displaceable mounting 5 of the discharge head 3.

As each fresh mould 2 is carried by the conveyor under the discharge head 3 of the mould filling installation, the gears 12 and 13 rotate in synchronism with the movement of the rotary table 1. Consequently, the selector tongue 14 actuates the contact means 15 associated with the corresponding mould, so that the corresponding bar 18 is connected to the control current circuit. According to the position of the interconnection made by the contact pin inserted in the perforations 19 of the cross-bar switch, particular ones of the bars 16 and 18 are connected together conductively by that pin. On the intake stroke of the metering cylinders 8 and 9, the movable selector 21 travels until it engages a particular limit switch contact means 20, which is connected by way of a respective further conductor bar 18 and the cross-bar switch 17 to a selected one of the first conductor bar 16. When that particular contact means 20 is operated, the control system stops the induction movement of the metering cylinders 8 and 9 and initiates the return movement of these metering cylinders. During the return movement the plastics mould filling components are forced out of the metering cylinders 8 and 9 and into the discharge head 3. Simultaneously, with this movement of the metering cylinders 8 and 9, there is taking place a movement of the displaceable mounting 5 of the discharge head 3, during which the discharge of the mixed plastics material into the mould 2 occurs. If the expulsion of plastics material from the discharge head 3 has ended, the control system allows the return movement of the displaceable mounting 5 to proceed, and releases a pulse to rotate the rotary table 1, whereby the next open mould is carried under the discharge head 3.

No illustration is shown of the nozzle cleaning position, into which the discharge head 3 is carried, with the aid of the displaceable mounting 5. The cleaning operation is arranged to take place when there are a number of adjacent moulds on the turntable 1 which are not to be filled, or when the functioning of the entire plant is interrupted. It is expedient for the cleaning position to be located outside the rotary table.

It is self-evident that the particular contact means 15 actuated by the rotary selector 14 form a closed circuit as the selector 14 rotates in synchronism with the step displacements of the rotary table 1. In general, the gear ratio of the gears 12, 13 is selected in such a way that one revolution of the gear 13 occurs during one revolution of the rotary table 1.

It has been found that the control arrangement for a multi-component plastics material mould plant described herein enables simple re-adjustment of the discharge quantities to be made during the mould filling operation.

We claim:

1. A control arrangement for a plastics material mould plant comprising in combination an endless conveyor,
a plurality of moulds mounted on said conveyor,
a source of mould filling material,
mould filling means to successively discharge said mould filling material into each of said moulds,
motivating means to impart a plurality of step displacements to said conveyor to position said moulds successively at said mould filling means,
control means to control the quantity of said mould filling material discharged into each of said moulds,
a selector switch having a first selector and a plurality of first contact means,
means to relatively displace said first selector with respect to said first contact means in synchronism with said step displacements of said conveyor to selectively operate one of said first contact means,
a crossed-bar switch having a plurality of first conductors and a plurality of further conductors, interconnecting means to selectably interconnect said first and further conductors, each of said first conductors being connected to a respective one of said first contact means of said selector switch,
said further conductors of said crossed-bar switch being connected to said control means to predetermine the quantity of said mould filling material discharged into the respective moulds in dependence on said selectable interconnections made by said interconnecting means.

2. An arrangement as defined in claim 1, wherein said selector switch comprises a rotary switch having a rotatable selector.

3. An arrangement as defined in claim 1, wherein said control means comprises at least one displaceable metering cylinder and co-operating piston, cylinder displacement means to relatively displace said cylinder with respect to said co-operating piston, a limit switch arrangement having a plurality of fixed second contact means and a second selector displaceable relative to said second contact means and coupled to said cylinder, each displacement of said cylinder relative to said co-operating piston, determining the quantity of said mould filling material discharged into a respective one of said moulds and each of said fixed second contact means of said limit switch being connected to a respective one of said further conductors of said crossed-bar switch.

4. An arrangement as defined in claim 3, wherein said at least one cylinder is displaced by said cylinder displacement means to perform an intake stroke prior to each of said successive discharges and each of said intake strokes is terminated when said selector of said limit switch engages a selected one of said fixed second contact means of said limit switch arrangement, said one fixed second contact means being selected in dependence on said selectable interconnections made by said interconnecting means.

5. An arrangement as defined in claim 1, comprising a discharge head to discharge said mould filling material into said moulds, discharge head displacement means to displace said head relative to the respective one of said moulds during each of said successive discharges of said mould filling material, a further limit switch arrangement having a plurality of third fixed contact means and a third selector displaceable relative to said third fixed contact means, coupling means for coupling said third selector to said discharge head, each of said third fixed contact means of said further limit switch being connected to a respective one of said further conductors of said crossed-bar switch, each of said displacements of said discharge head being terminated when said third selector of said further limit switch arrangement engages a selected one of said third fixed contact means of said further limit switch, said one third fixed contact means being selected in dependence on said selectable interconnections made by said interconnecting means.

6. An arrangement as defined in claim 5, comprising a source of solvent of said mould filling material, a control switch controlling supply of said solvent to said discharge head, one of said third fixed contact means of said further limit switch corresponding to a maintenance position of said discharge head, said one third fixed contact means of said further limit switch arrangement being connected to one of said further conductors of said crossed-bar switch and said one further conductor being connected to said control switch.

References Cited

UNITED STATES PATENTS

| | | | |
|---|---|---|---|
| 3,122,782 | 3/1964 | Moore | 18—12 TCX |
| 3,413,682 | 12/1968 | Wucher | 18—4 P |
| 3,538,548 | 11/1970 | Tenner | 18—14 V |

ROBERT L. SPICER, JR., Primary Examiner

U.S. Cl. X.R.

18—2 HA, 5 RR, 20 H, 30 CM; 141—157; 200—176, 179